United States Patent [19]

Köhler et al.

[11] 4,128,533

[45] Dec. 5, 1978

[54] PROCESS FOR THE PRODUCTION OF HIGH MOLECULAR WEIGHT POLYESTERS

[75] Inventors: Armin Köhler; Herbert Pelousek, both of Dormagen; Helmut Ohse, Zons; Hans Westermann; Karl-Heinz Magosch, both of Marl, all of Germany

[73] Assignees: Bayer Aktiengesellschaft, Leverkusen; Faserwerke Hüls Gesellschaft mit beschränkter Haftung, Marl, both of Germany

[21] Appl. No.: 825,421

[22] Filed: Aug. 17, 1977

[30] Foreign Application Priority Data

Aug. 21, 1976 [DE] Fed. Rep. of Germany ....... 2637813

[51] Int. Cl.$^2$ ............................................. C08G 63/14
[52] U.S. Cl. .................................. 528/279; 528/272; 528/308

[58] Field of Search ...................................... 260/75 R

[56] References Cited

U.S. PATENT DOCUMENTS

| | | | |
|---|---|---|---|
| 3,446,763 | 5/1969 | Okuzumi | 260/75 R X |
| 3,907,754 | 9/1975 | Tershansy et al. | 260/75 R |
| 3,962,189 | 6/1976 | Russin et al. | 260/75 R |
| 4,010,145 | 3/1977 | Russin et al. | 260/75 R |

*Primary Examiner*—Lucille M. Phynes
*Attorney, Agent, or Firm*—Plumley and Tyner

[57] ABSTRACT

The invention relates to a process for the production of a high molecular weight polyester, which comprises reacting a dicarboxylic acid or derivative thereof with a diol in the presence of a combination of compounds of manganese, magnesium, titanium and antimony as a catalyst.

8 Claims, No Drawings

PROCESS FOR THE PRODUCTION OF HIGH MOLECULAR WEIGHT POLYESTERS

This invention relates to a process for the production of high molecular weight polyesters using a certain catalyst combination.

It is known that high molecular weight fibre-forming polyesters can be produced from dicarboxylic acids and diols. The most well known representative of this class of polyesters is polyethylene terephthalate. Production may be carried out either by directly esterifying the dicarboxylic acid with the glycol or by transesterifying a dicarboxylic acid ester with the glycol, followed in each case by polycondensation. The most well known processes of this type, so far as the production of polyethylene terephthalate is concerned, are the direct esterification of terephthalic acid with ethylene glycol and the transesterification of dimethyl terephthalate with ethylene glycol. Esterification, transesterification and polycondensation catalysts can be used in these processes. A whole number of catalysts such as these are described in the literature (cf. H. Ludewig, "Polyesterfasern" (Polyester Fibres), Akademieverlag Berlin (1975), pages 104 and 113 to 121).

Nevertheless, there is a considerable need to find new catalysts for the production of high molecular weight polyesters which shorten the reaction times of the processes carried out with conventional catalysts and hence lead to lighter, substantially colourless products and/or enable higher molecular weights to be obtained.

Accordingly, it was an object of the present invention to provide a catalyst system by which it is possible, in the production of high molecular weight polyesters, to reach the necessary molecular weights. It was a further object of the invention to provide a catalyst by the aid of which a substantially colourless product can be obtained. Still another object of the invention was to provide a catalyst by which the polyester production can be achieved in shorter reaction times.

A special object of the invention was it to provide a catalyst system by which it is simultaneously possible to reach the necessary molecular weights, to obtain a substantially colourless product and to shorten the reaction time.

Other objects will be evident from the following description and the Examples.

These objects are accomplished by using a catalyst combination of a manganese compound, a magnesium compound, a titanium compound and an antimony compound in the production of high molecular weight polyesters.

Accordingly, the present invention provides a process for the production of a high molecular weight polyester, which comprises reacting a dicarboxylic acid or derivative thereof with a diol in the presence of a combination of compounds of manganese, magnesium, titanium and antimony as a catalyst.

This catalyst combination is suitable both for the direct esterification process and for the transesterification process the antimony compound preferably not being added until the polycondensation stage. The catalyst combination according to the invention is preferably used in the transesterification/polycondensation process.

Suitable metal compounds are any compounds of the metals manganese, magnesium, titanium and antimony which can be effectively dispersed in the reaction medium and which are as soluble as possible therein. Manganese acetate, magnesium acetate, isopropyl titanate and antimony trioxide, the latter particularly in solution in ethylene glycol, have proved to be excellent representatives of this class.

The metal compounds are used generally in such a quantity that the initial reaction mixture contains from 2 to 120 ppm and preferably from 50 to 70 ppm of manganese, from 2 to 120 ppm and preferably from 4 to 12 ppm of magnesium and from 0.5 to 50 ppm, preferably from 1 to 10 ppm of titanium, expressed in each case as metal.

The antimony compound is added in a quantity of from 100 to 500 ppm and preferably in a quantity of from 250 to 350 ppm of antimony, expressed as metal, preferably before the polycondensation step.

All the ppm figures are based in each case on the quantity of dicarboxylic acid present in the reaction mixture, expressed as dimethyl carboxylate.

Both the direct esterification process and also the transesterification process, followed in each case by polycondensation, and the reaction conditions under which they are carried out, are sufficiently well known that there is no need for them to be discussed in detail here. In this connection, reference is made in particular to H. Ludewig, "Polyesterfasern" (Polyester Fibres), Akadamieverlag Berlin (1975), pages 95 to 175. Both batch-type processes and also continuous processes are suitable.

The catalyst system according to the invention may be used for the production of any high molecular weight polyesters which are suitable for the production of filaments and fibres and also injection-moulded articles. Polyesters of this type are, in particular, the polyesters of terephthalic acid, but also polyesters of isophthalic acid and 1,4-cyclohexane dicarboxylic acid and, in some cases, also polyesters of aliphatic dicarboxylic acids, such as adipic acid and sebacic acid and also the copolyesters of these dicarboxylic acids. The diol components of the polyester may be any of the glycols suitable for polyesters of the type in question, especially ethylene glycol, 1,4-butane diol and 1,4-cyclohexane dimethanol.

Under high molecular polyesters are to understand such polyesters having a relative solution viscosity of e.g. from 1,090 to 1,230 (0,23% by weight solution in 60 parts by weight of phenol and 40 parts by weight of tetrachloroethane at 25° C), especially in the case of a polyester prepared from dimethyl terephthalate and ethylene glycol.

The use of compounds of manganese, magnesium, titanium and antimony either individually or in other combinations was already known per se in the production of polyesters.

However, the catalyst system according to the invention has in particular the following advantages:

The polycondensation temperature which, in the case of the manganese/magnesium/antimony system, has to be kept at 295° C on account of the antimony, can be reduced by 10 to 15° C to 280-285° C by the addition of titanium. This means that, in continuous processes where, for example, spinning of the polyester into filaments takes place immediately after polycondensation, the spinning temperature can be freely selected between 280° and 295° C.

The low polycondensation temperature of 280° C has the further advantage that, when it may be desired to utilise the reactor capacity to a greater extent in continuous operation, the polycondensation temperature may be further increased by 15° C to 295° C, giving an increase in throughput of from 25 to 30% for the same molecular weight of leading to a higher molecular weight for the same throughput.

The relatively low polycondensation temperature enables a polyester with a small number of carboxyl groups to be obtained.

The catalyst combination according to the invention has a markedly synergistic effect, as demonstrated by the following experiment:

Certain quantities of manganese and magnesium and a certain quantity of titanium are used as transesterification and polycondensation catalysts and the polyester is spun off. The polyester has a certain relative viscosity. However, a granulate with the same relative viscosity is also obtained when the same quantities of manganese and magnesium and a certain quantity of antimony are added. If, in a third test, titanium and antimony are each added in half the quantity for the same quantities of manganese and magnesium, the polyester obtained might be expected to have the same relative solution viscosity as that obtained in the first two tests. Instead of this, however, the polyester obtained has a higher relative viscosity and a lower number of carboxyl groups than expected, which is clearly attributable to the synergistic effect of the titanium/antimony combination.

In order to examine more closely the colour of the polyesters produced, the colour valency, which consists of three colour values and clearly defines a colour, was determined. The preference system is the internationally agreed CIE System which is equivalent to the Standard Valency System according to DIN 5033. Under the CIE System, the colour values are denoted by X, Y and Z.

The a- and b-values may be determined in turn from these values in accordance with the following formulae (cf. also ASTM Method D 2244):

$$a = 1.75 f_y (1.020 \cdot X - Y)$$

$$b = 0.70 f_y (Y - 0.847 \cdot Z)$$

$$f_y = 0.51 \frac{(21 + 0.2 \cdot Y)}{(1 + 0.2 \cdot Y)}$$

The a- and b-values are a measure of whether the polyester granulate has a red, green, yellow or blue tinge in that:

a positive a-value = a red tinge
a negative a-value = a green tinge
a positive b-value = a yellow tinge
a negative b-value = a blue tinge The a-value should be as close as possible to zero, whilst the b-value should be less than 6.

For measurement, the ground polyester granulate is introduced into a round cuvette. The three-range colour measuring process is carried out with an ELREPHO filter photometer manufactured by the Carl Zeiβ Company of Oberkochen. In this process, the degree of remission of the sample is measured with three special colour measuring filters and the colour values X, Y and Z are simply calculated from the remission values $R_X$, $R_Y$ and $R_Z$ in accordance with the following formulae:

For standard type C light:

$$X = 0.782 \cdot R_X + 0.198 \cdot R_Z$$

$$Y = R_Y$$

$$Z = 1.181 \cdot R_Z.$$

Thermal stability is measured on a filament yarn of denier dtex 167 f 34. The yarn is subjected to a weight of 1.5 p/dtex in a chamber heated to 160° C. An automatic recorder records after how many hours the filament breaks.

The number of carboxyl groups is determined by a method known from the literature (H. Ludewig "Polyesterfasern" (Polyester Fibres), Akademieverlag, Berlin, 1975, page 188) and is expressed in val/t.

The relative solution viscosity is a measure of the molecular weight of the polyester formed. According to the present invention, the relative solution viscosity is the ratio of the viscosity of a 0.23% by weight solution of polyester in 60 parts by weight of phenol and 40 parts by weight of tetrachloroethane to the viscosity of the pure solvent mixture, as measured in the same units at a temperature of 25° C.

The following Examples are to further illustrate the invention without limiting it.

EXAMPLE 1

80 kg of dimethyl terephthalate (DMT) and 77 kg of ethylene glycol (molar ratio 1:3) are introduced into an autoclave. 8 ppm of magnesium (5.64 g of Mg-acetate . 4 $H_2O$), 60ppm of manganese (22.3 g of Mn-acetate . 4 $H_2O$), 5ppm of titanium (2.4 g of isopropyl titanate) and 300 ppm of antimony (28.8 g of antimony trioxide) are added as catalysts. Transesterification is carried out over a period of 3 hours at 200° C under normal pressure. Precondensation is carried out over a period of 0.5 hour at a temperature of 220° C. Polycondensation is then carried out over a period of 2.5 hours at 280° C under a pressure of < 1 Torr, followed by spinning and granulation.

72 kg of polyethylene terephthalate with the following properties are obtained:
melting point — 256° C
relative viscosity — 1.164
number of carboxyl groups — 25 val/t
a-value — −0.1
b-value — +4.5

A filament yarn spun from this granulate has the following properties:
strength — 4.5 cN/dtex
elongation — 27%

Under thermal load in the heating chamber, the filament breaks after 101 hours.

EXAMPLE 2

80 kg of dimethyl terephthalate and 77 kg of ethylene glycol (molar ratio 1:3) are introduced into an autoclave. 8 ppm of magnesium (5.6 g of Mg-acetate . 4 $H_2O$), 60 ppm of manganese (22.3 g of Mn-acetate . 4 $H_2O$), 5 ppm of titanium (2.4 g of isopropyl titanate) and 300 ppm of antimony (28.8 g of antimony trioxide) are added as catalysts. Transesterification is carried out over a period of 3 hours at 200° C under normal pressure. Thereafter 32 ppm of phosphorus (28.8 g of triphenyl phosphate) are added as a stabilizer. Precondensation is carried out over a period of 0.5 hour at 220° C. Polycondensation is then carried out over a period of 2.5 hours at 280° C under a pressure of < 1 Torr, followed by spinning and granulation.

72 kg of polyethylene terephthalate with the following properties are obtained:
- melting point — 256° C
- relative viscosity — 1.165
- number of carboxyl groups — 19 val/t
- a-value — −0.05
- b-value — +3.9

A filament yarn spun from this granulate has the following properties:
- strength — 4.4 cN/dtex
- elongation — 28%

Under thermal load (160° C) in the heating chamber, the filament breaks after 113 hours.

EXAMPLE 3

In a continuous polycondensation apparatus, dimethyl terephthalate and ethylene glycol in a ratio of 1:2.8 are delivered to a reactor. 65 ppm of manganese in the form of Mg-acetate . $H_2O$, 9 ppm of magnesium in the form of Mn-acetate . $H_2O$, 4 ppm of titanium in the form of isopropyl titanate and 295 ppm of antimony in the form of antimony trioxide are added as catalysts. Transesterification is carried out at 200° C. In the next reactor, precondensation is carried out at 220° C/100 Torr and, in the last reactor, polycondensation is carried out at 280° C/<1 Torr. The melt may either be granulated or may be directly delivered to a spinning apparatus.

The granulate has the following properties:
- melting point — 256° C
- relative viscosity — 1.159
- number of carboxyl groups — 23 val/t
- a-value — −0.11
- b-value — +4.3

The apparatus has an output of approximately 1800 kg/hour and a polycondensation temperature of 280° C. However, if the polycondensation temperature is increased from 280° C to 295° C, output can be increased to 2250 kg/hour. The granulate produced in this way shows the following values:
- melting point — 256° C
- relative viscosity — 1.158
- number of carboxyl groups — 24 val/t
- a-value — −0.12
- b-value — +4.4

EXAMPLE 4

(a) 97 g of DMT and 93 g of ethylene glycol are introduced into a glass autoclave. 8 ppm of magnesium in the form of Mg-acetate . 4 $H_2O$, 60 ppm of manganese in the form of Mn-acetate . 4 $H_2O$ and 10 ppm of titanium in the form of isopropyl titanate are added as catalysts. Transesterification is carried out over a period of 3 hours at 200° C. The temperature is then increased to 220° C, followed by precondensation for 30 minutes. Polycondensation then takes place over a period of 2 hours at 275° C/< 1 Torr. The product is then spun off and granulated. The polyethylene terephthalate obtained has the following properties:
- melting point — 256° C
- relative viscosity — 1.162
- number of carboxyl groups — 27 val/t (b) The procedure and conditions are the same as in (a), except that the catalysts used are as follows:
- 8 ppm of magnesium in the form of Mg-acetate . 4 $H_2O$
- 60 ppm of manganese in the form of Mn-acetate . 4 $H_2O$
- 300 ppm of antimony in the form of $Sb_2O_3$.

The granulate obtained has the following properties:
- melting point — 256° C
- relative viscosity — 1.163
- number of carboxyl groups — 24 val/t (c) The test is carried out under the same conditions as in (a), except that the catalysts used are as follows:
- 60 ppm of manganese in the form of Mn-acetate . 4 $H_2O$
- 8 ppm of magnesium in the form of Mg-acetate . 4 $H_2O$
- 5 ppm of titanium in the form of isopropyl titanate
- 150 ppm of antimony in the form of $Sb_2O_3$).

The granulate of this test has the following properties:
- melting point — 256° C
- relative viscosity — 1.169
- number of carboxyl groups — 20 val/t.

Although only half the quantity of titanium from test (a) and half the quantity of antimony from test (b) were used, so that the same relative viscosity as in these two tests could be expected, a higher molecular weight was reached. In addition, the number of carboxyl groups was improved in relation to tests (a) and (b). Both effects are attributable to the synergistic effect of the manganese/magnesium/titanium/antimony catalyst system.

What we claim is:

1. A process for the production of a high molecular weight polyester, which comprises reacting a dicarboxylic acid or derivative thereof with a diol in the presence of a combination consisting essentially of compounds of manganese, magnesium, titanium and antimony as a catalyst.

2. The process of claim 1, wherein said manganese compound is manganese acetate.

3. The process of claim 1, wherein said magnesium compound is magnesium acetate.

4. The process of claim 1, wherein said titanium compound is isopropyl titanate.

5. The process of claim 1, wherein said antimony compound is antimony trioxide.

6. The process of claim 1, wherein manganese acetate, magnesium acetate, isopropyl titanate and antimony trioxide are used as the said catalyst combination.

7. The process of claim 1, wherein said metal compounds of said catalyst are used in such a quantity that the reaction mixture initially contains from 2 to 120 ppm of manganese, from 2 to 120 ppm of magnesium and from 1 to 10 ppm of titanium (all expressed as metals), and that from 100 to 500 ppm of antimony (expressed as metal) are added before the polycondensation step, based in each case on the quantity of said carboxylic acid or said derivative thereof.

8. A high molecular weight polyester when produced by a process as claimed in claim 1.

* * * * *